United States Patent Office.

HENRY A. PEASE, OF HARTFORD, CONNECTICUT, ASSIGNOR TO HIMSELF AND JEREMY W. BLISS, OF SAME PLACE.

*Letters Patent No. 82,635, dated September 29, 1868.*

IMPROVEMENT IN THE MANUFACTURE OF SOAP.

*The Schedule referred to in these Letters Patent and making part of the same.*

TO ALL WHOM IT MAY CONCERN:

Be it known that I, HENRY A. PEASE, of the city and county of Hartford, and State of Connecticut, have invented a certain new and useful Improvement in the Manufacture of Soaps, for the various purposes for which soap is used; and to enable others skilled in the art to make the same, I will proceed to describe the ingredients and proportions, (which may be considerably varied,) the nature of which will be understood from the following specification.

This soap is designed particularly for family, fulling, and scouring purposes, and may be readily adapted for shaving and toilet-soap, and is susceptible, like most of other soaps, of variation of proportions of each and all of the distinctive ingredients hereinafter mentioned, to produce the different grades of soap, and also according to the strength or quality of the material or ingredients as found in the market for sale.

The ingredients which I use (in different proportions, as the desired quality of soap requires) are as follows:
"Cotton-seed stock."
"Stearine or elain."
"Caustic."
"Starch."

For a soap for fulling cloth, take about one-half each of stearine-oil or oils and cotton-seed oil or stock. Boil on caustic lye, of about twenty degrees, (20°,) until the mass is saponified. Then allow the lye to drain off from the soap. Then add lye, of about fifteen degrees (15°) strength, to supply or produce the requisite strength to the soap, and again allow the lye to drain off. Then, to a quantity of water about equal to the above ingredients, add about ten per cent. of starch. Mix, and boil until the whole becomes plastic, and globules disappear, and the surface shows a good finish. Then draw off into barrels, and add about one pound of caustic lye, of about twenty degrees (20°) strength, to a barrel, and stir until thick or solid, when it will be finished, and ready for use.

For scouring-soap, I omit the use of starch, and add more lye, as circumstances require.

The formula of manufacturing soap (from which this does not materially differ) is so generally and well understood, I have deemed it unnecessary to enter fully into its description.

I believe I have thus shown the nature of this invention, so as to enable others skilled in the art to make the same therefrom.

What I claim, therefore, and desire to secure by Letters Patent, is—

A soap-compound, of the ingredients, in greater or less proportion, as required, substantially as described.

HENRY A. PEASE. [L. S.]

Witnesses:
E. W. BLISS,
H. W. HUTCHINSON.